July 8, 1958   J. B. McWILLIAMS   2,842,069
BALLAST DISTRIBUTOR

Filed Sept. 11, 1953   8 Sheets-Sheet 1

Fig. 1

INVENTOR.
James B. McWilliams
BY
HIS ATTORNEYS

Fig. 3
Fig. 4

INVENTOR.
James B. McWilliams

July 8, 1958 — J. B. McWILLIAMS — 2,842,069
BALLAST DISTRIBUTOR
Filed Sept. 11, 1953 — 8 Sheets-Sheet 4

INVENTOR.
James B. McWilliams
BY *Well, Mackey + Burden*
HIS ATTORNEYS

July 8, 1958　　J. B. McWILLIAMS　　2,842,069
BALLAST DISTRIBUTOR

Filed Sept. 11, 1953　　　　　　　　　　　　8 Sheets-Sheet 5

Fig. 8

INVENTOR.
James B. McWilliams
BY
HIS ATTORNEYS

July 8, 1958 — J. B. McWILLIAMS — 2,842,069
BALLAST DISTRIBUTOR
Filed Sept. 11, 1953 — 8 Sheets-Sheet 6

INVENTOR.
James B. McWilliams
BY
HIS ATTORNEYS

July 8, 1958

J. B. McWILLIAMS 2,842,069

BALLAST DISTRIBUTOR

Filed Sept. 11, 1953

INVENTOR.
James B. McWilliams

BY

HIS ATTORNEYS

United States Patent Office 2,842,069
Patented July 8, 1958

2,842,069

BALLAST DISTRIBUTOR

James B. McWilliams, Pittsburgh, Pa., assignor to Railway Maintenance Corporation, Pittsburgh, Pa.

Application September 11, 1953, Serial No. 379,629

1 Claim. (Cl. 104—5)

The present invention relates to a machine for distributing ballast and, more particularly, to an improved machine for removing ballast as it lies along a track and distributing it between and along the ends of ties supporting the track.

Ballast is very commonly used in combination with railroad ties, because it affords good support and fast drainage. In time, however, some of the crushed rock or stone constituting the ballast drifts from between the ties and away from the ends causing the tracks to become unevenly supported. Also, the porous ballast eventually becomes clogged with dirt and other debris which interfere with proper drainage. Accordingly, it is necessary periodically to gather the ballast and distribute it, together with new ballast deposited along the ties for that purpose, to a desired position between and about the ties and also preferably to clean the ballast.

Several machines have been heretofore suggested for this purpose, but they are subject to several faults. It is the practice to provide bucket conveyors which depend from the sides of the machine and pick up the ballast along the ties. When in use such conveyors must extend appreciably from the supporting machine in order to reach the ballast. However, when the machine is not collecting the ballast but merely traveling along a track as to a point of use, the machine is most awkward and slow to navigate if the conveyors are in such an extended position. The bucket conveyors, therefore, are ordinarily adapted to be bodily extended away from the machine when collecting ballast and retracted toward the machine when not in use. Heretofore, the means for accomplishing the extension and retraction have been complicated and have unduly added to the weight of the machine as well as making its operation more intricate. For example, it has been suggested actually to fold a conveyor and then pivot it about an upper end to withdraw it from an extended position. It has also been suggested to pivot a conveyor about a central point to a horizontal position and then draw it over the frame of the machine. Still others have suggested pivoting a conveyor to a horizontal position and then bodily revolving the conveyor over the machine as through a 90° arc. All of such arrangements are cumbersome and make the machine unwieldly and slow to operate.

Another fault in prior machines concerns the release of the gathered ballast from a hopper. Before the present invention, the practice has been to employ a rigidly fixed hopper which results in little or no control of the flow of the ballast from the hopper toward the ties. Further, the prior hoppers themselves were nothing more than chutes which only directed the ballast with no control over the direction or amount of flow within the hopper itself. The prior art machines were also directly powered through engines and connecting gears. Consequently, the machine was subject to blacklash, and particularly when a conveyor or similar part was stalled as by striking a hard or rooted object, the shock wave through the direct mechanical linkages was sometimes sufficiently severe to break output shafts and the like.

The present invention obviates the foregoing objections and, in addition, provides still other advantages. In the present ballast distributor, a conveyor is permanently angularly related to the base or frame of the distributor. The hopper is vertically reciprocable to allow it to assume a plurality of working positions. Moreover, the hopper has auxiliary equipment which further controls the amount and direction of ballast flow within the hopper itself. Additionally, the operation of all the parts of the ballast distributor is powered from a hydraulic system, and accordingly, the moving parts are not subject to shock and backlash.

For example, in one form the present invention includes a base or frame, adapted to travel a track, having a bucket conveyor depending from each side in angular relation therewith. A pantograph in a compound action very easily and quickly extends and retracts each conveyor with respect to the base and simultaneously raises and lowers each conveyor, all without substantially changing the angular relation. Each conveyor discharges the collected ballast into a vertical reciprocable hopper which is adapted to assume a working position at any desired elevation from the track. This vertical movement of the hopper enables it to control the rate of ballast flow therefrom as the distributor travels along the track. The hopper also has end and side gates which are individually operable and an internal deflector plate which may be selectively positioned within the hopper, all of which provide a control on the direction and rate of ballast flow. A fuel-fired engine pressurizes a hydraulic system which drives the designated parts as well as propelling the ballast distributor along the track. Accordingly, the shock-absorbing, smooth and flexible operation afforded by a hydraulic system projects the moving parts of the distributor from shock and backlash.

Additionally, the present machine may also include a scoop which is adapted to vertical and horizontal movement with respect to the lower end of each conveyor whereby the scoop can be placed in a plurality of settings to perform a variety of functions in cooperation with the conveyor. Still further, the present ballast distributor includes means to lift it from the track as when removing the machine to a different track or to allow a train approaching on the same track to pass.

The accompanying drawings disclose a presently preferred embodiment in which:

Figures 5, 6, and 7 are front elevations of the lower end of a conveyor showing some of the settings a scoop may take in cooperation therewith;

Figure 9 is a side elevation similar to Figure 1 illustrating apparatus for removing the distributor from a track;

Figure 1:
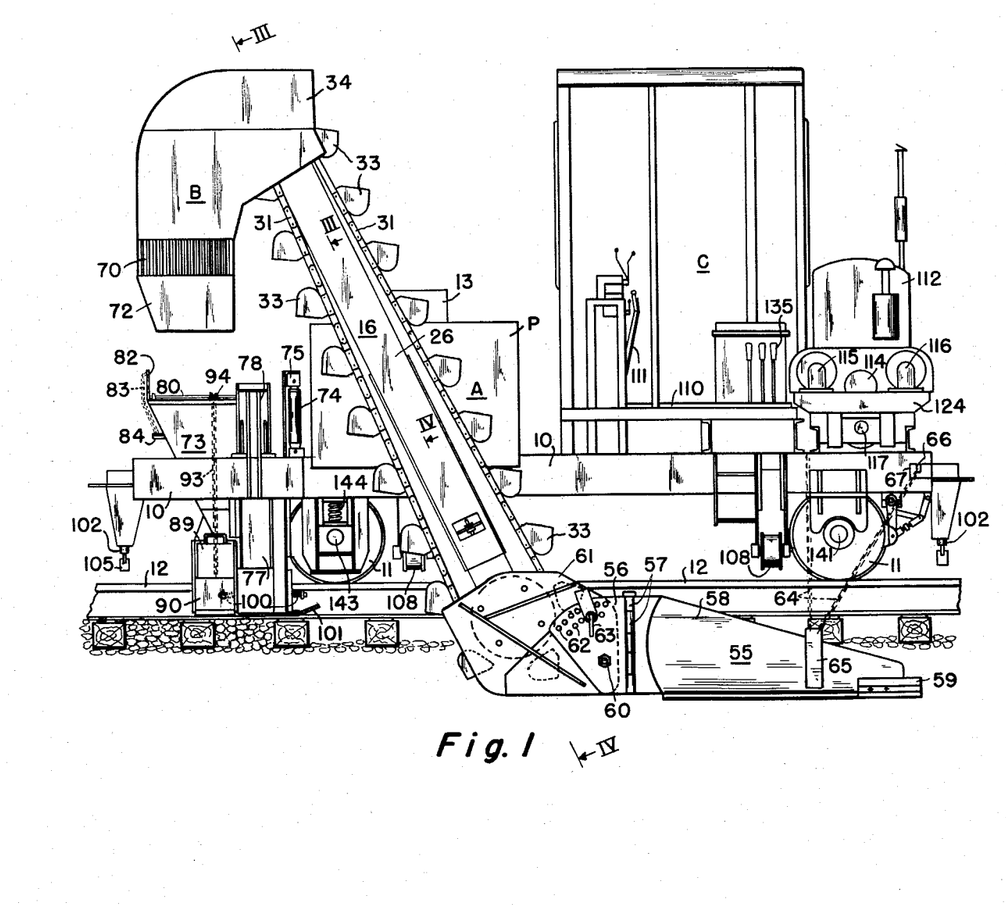
Figure 1 is a side elevation of the ballast distributor showing a general arrangement of parts.
Figure 2:
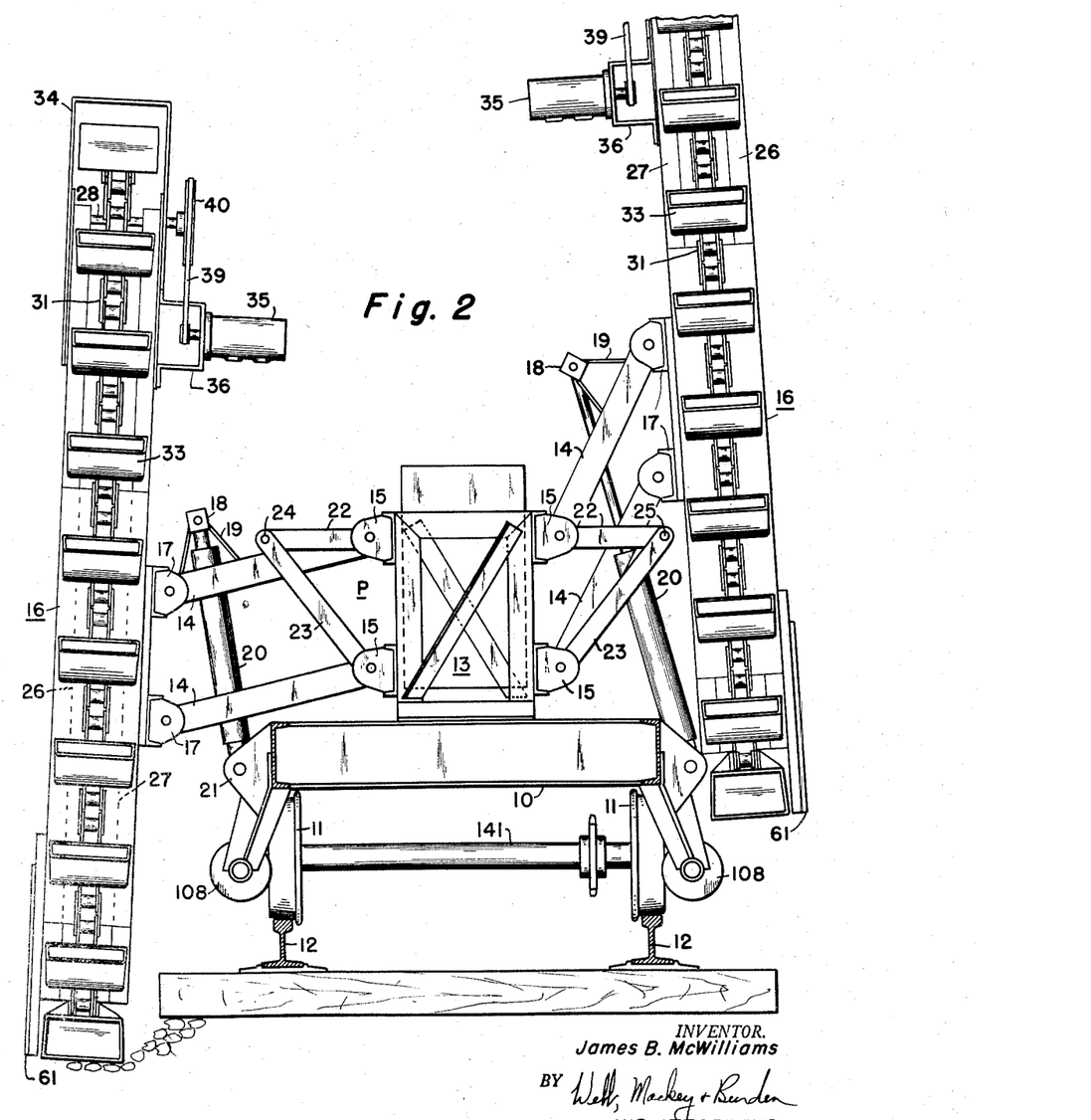
Figure 2 is a front elevation of a conveyor and the pantograph for extending and retracting it.
Figures 3, 4:
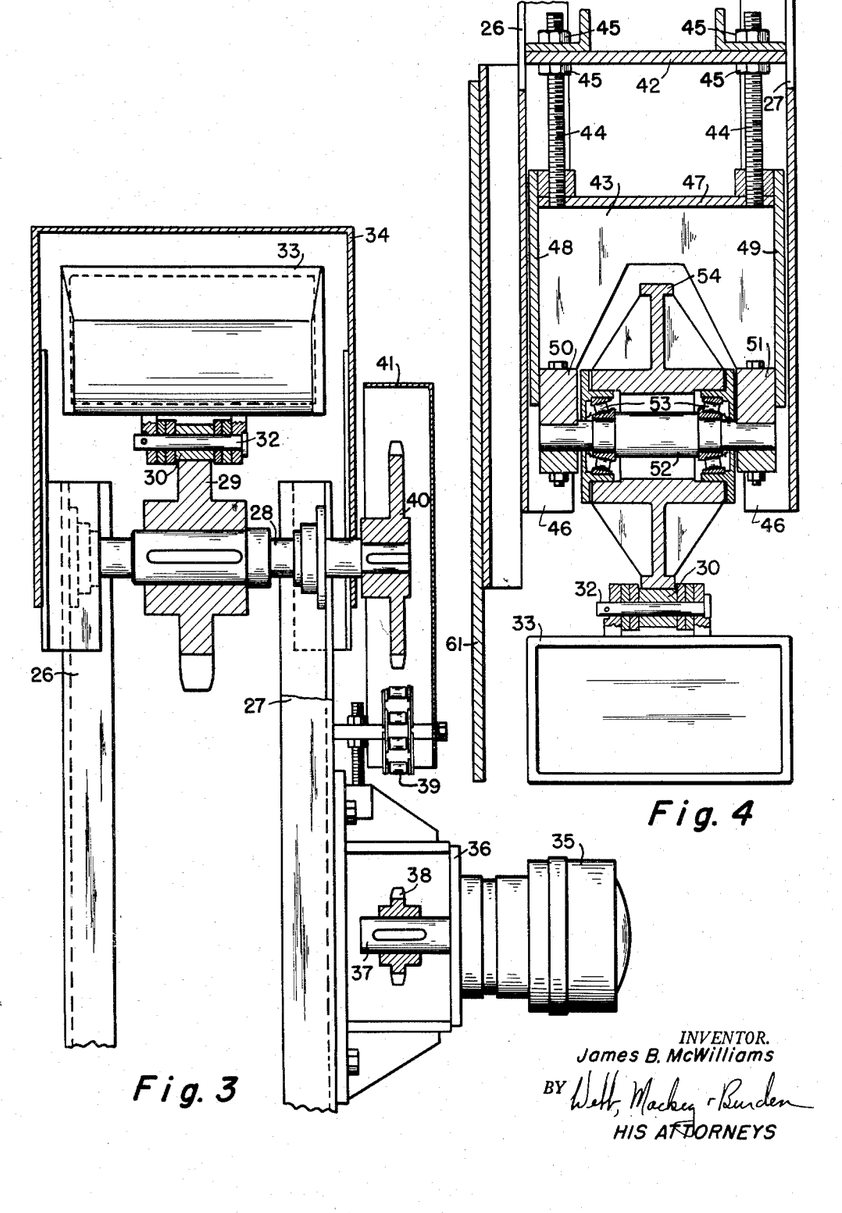
Figures 3 and 4 are sections of Figure 1 on the lines III—III and IV—IV, respectively.

The present ballast distributor includes a base or frame 10 conventionally adapted by wheels 11 to travel rails 12. The base supports the apparatus which for convenience of disclosure may be divided as shown in Figure 1 into three parts including a conveyor section A, a hopper section B, and an operation section C.

The conveyor section

Referring to Figures 1 through 7, the base 10 carries a hydraulic oil tank 13 in a frame to which a pantograph P is secured. The pantograph consists of four arms 14, two on each end of the tank, which are pivotally joined thereto at the brackets 15 and to a bucket conveyor 16 at the brackets 17. A crossbar 18 extends between and is rigidly secured to the upper pantograph arms by strips 19. A hydraulically operated cylinder 20 pivotally joins at its opposite ends the crossbar 18 and a bracket 21 on the base 10. The pantograph may be locked in a retracted position by locking arms 22 and 23 which are secured at the brackets 15 and have openings 24 at their other ends to receive a loosely fitting locking rod 25. The rod may be easily removed and reinserted through the openings 24 below the lower pantograph arms 14 and when in the latter position locks the pantograph in the retracted position.

The bucket conveyor 16 depends from the side of the base 10 in angular relation therewith and includes side frames 26 and 27 (Figure 3) through an upper end of which a shaft 28 having a sprocket 29 is journaled. The sprocket engages a roller 30 of a continuous chain 31 to which a pin 32 fastens a digging bucket 33. A chute 34 catches the discharge of the bucket as it rounds the sprocket 29. A hydraulic motor 35 carried by support 36 secured to the frame 27 has a shaft 37 carrying a sprocket 38. By means of a chain 39, sprocket 38 drives another sprocket 40 keyed to an extension of the shaft 28 within the guard 41.

The lower end of the conveyor 16 (Figure 4) may be adjustably positioned. A fixed plate 42 supports a cage 43 by bolts 44 which can be raised or lowered in the plate 42 by suitably adjusting the nuts 45, thereby sliding the cage 43 along the guide strips 46. The cage includes a plate 47 secured to the bolts 44 and walls 48 and 49 which join slide blocks 50 and 51, respectively. A shaft 52 journaled between the blocks has bearings 53 in which a sprocket 54 rides. This sprocket also engages a roller 30 of the continuous chain 31 to which a pin 32 fastens a digging bucket 33.

The lower end of the conveyor 16 also has a scoop which is adapted to vertical and horizontal movement therewith. For example, the scoop generally shown at 55 (Figure 1) includes a plate 56 hinged at 57 to an arcuate sheet 58 which may have a runner 59 to aid in its functions as hereinafter explained. The plate 56 is pivotally connected at 60 to a scoop plate 61 which is secured to the lower end of the conveyor. The plate 56 has a plurality of openings 62, any one or more of which may be aligned with a similar opening (not shown) in the scoop plate 61 and temporarily locked in that position by a key 63 inserted through the aligned openings. In this manner, vertical movement of the scoop 55 is controlled. Chains 64 fixed to a strip 65 on the arcuate sheet 58 may be secured at any point along the length of each chain to the base 10 as by fitting a link through a slot 66 in a plate 67. Since the force of the ballast always urges the sheet 58 away from the base, the selected lengths of the chains 64 control the horizontal movement of the scoop.

Figures 5, 6, 7, 9, 15:
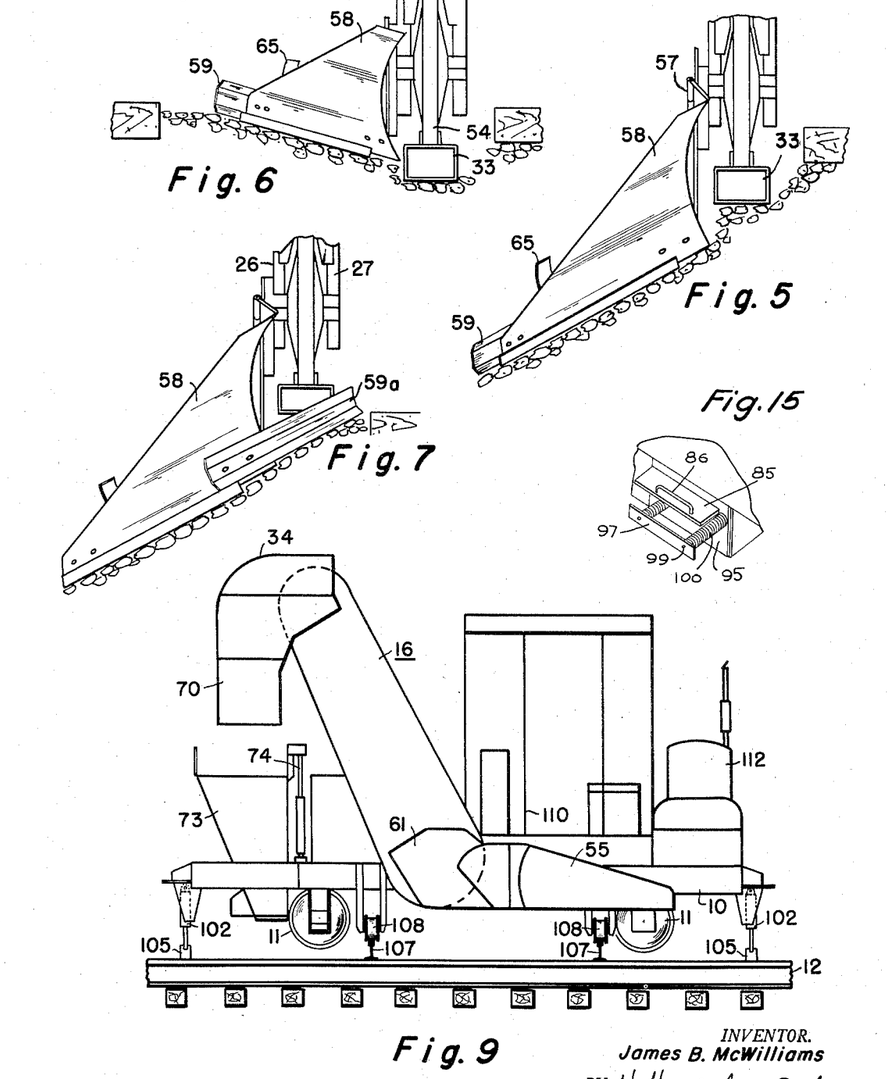

The foregoing arrangement enables the scoop to assume a plurality of settings to perform a variety of functions. For example, in Figure 5 the illustrated setting is for shoulder digging. In this case, the runner 59 is detachably secured to the sheet 58 and extends somewhat beyond the sheet. In Figure 6, the setting is for intertrack digging wherein the scoop is pivoted upwardly as compared to Figure 5. In Figure 7, the setting is for dressing the bed as after ballast distribution. In this instance, a runner 59a is detachably secured as by suitable nuts and bolts to the inward end of the sheet 58. In any of these settings, the horizontal movement of the scoop can be selected to meet varying requirements.

The construction of the pantograph and conveyor on the other side of the base 10 is the same as that just described.

The hopper section

Figure 8:
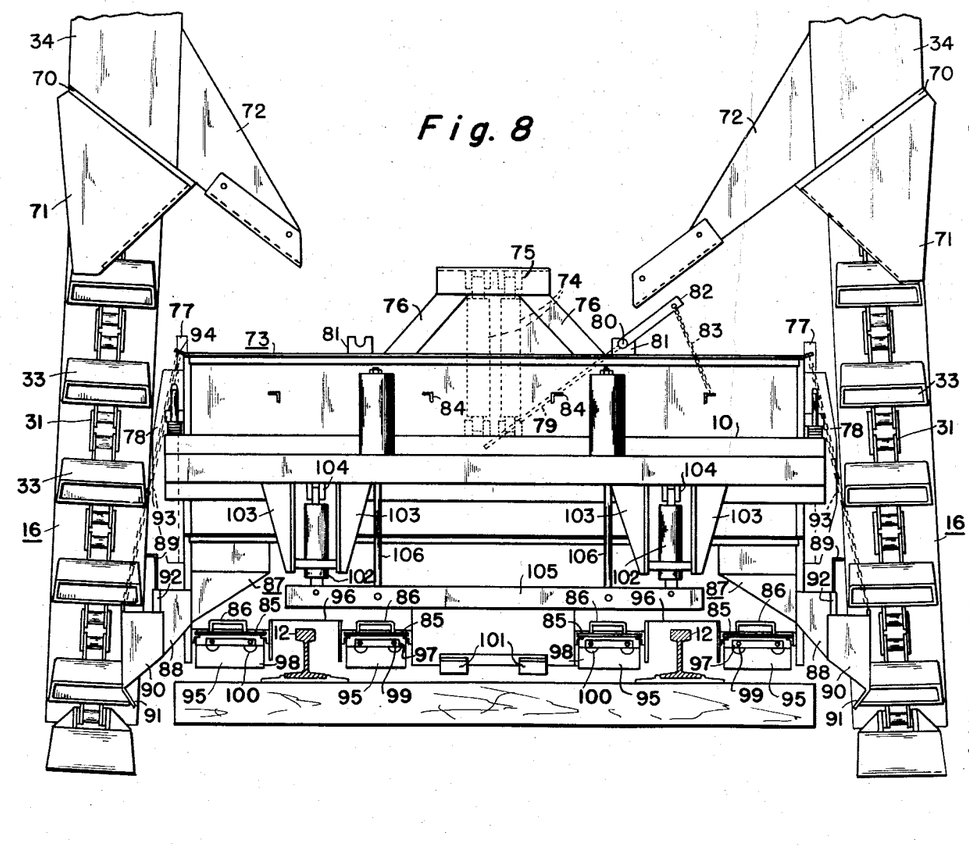
Figure 8 is an end elevation of Figure 1 illustrating the vertically reciprocable hopper.
Figure 10:
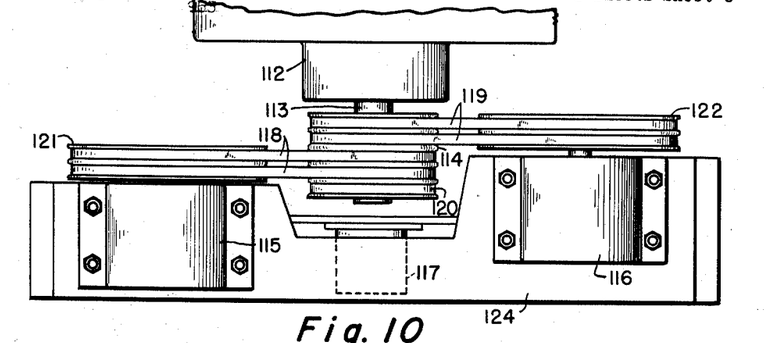
Figures 10 and 11 are plan and side elevations, respectively, of the engine and hydraulic pumps.
Figure 11:
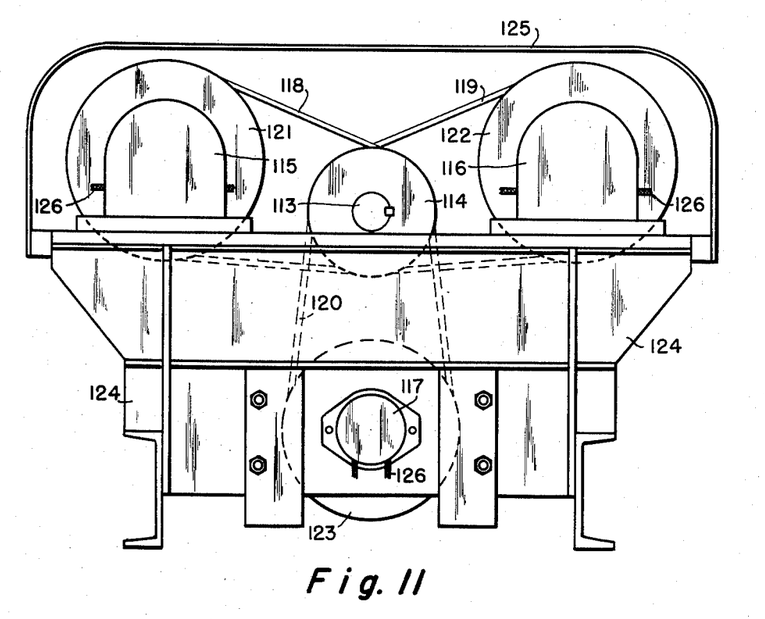

Referring principally to Figures 1 and 8, the bottoms of each of the chutes 34 which catch the discharge from the conveyors comprise a reticulate surface 70 to clean the ballast. The openings of the surface are of such size as to pass dirt and other debris collected with the ballast and to retain the ballast. A flap 71 sprays the dirt away from the track, while the lateral chute extension 72 directs the ballast into a hopper 73 which extends transversely across the track. Two hydraulic cylinders 74 pivotally join the base 10 and a bar 75 attached to the hopper 73 by angle irons 76. The ends of the hopper have channels 77 in which runners 78 slide as the cylinders 74 vertically reciprocate the hopper. The runners 78 are rigidly secured to angle irons supported over the base. One or more deflector plates 79 may be selectively positioned within the hopper to direct the ballast. The plates are attached at an edge to a rod 80 resting in brackets 81 fixed to the tops of opposite sides of the hopper. Each rod has a handle 82 and a chain 83 secured to the handle. By inserting a selected link of a chain 83 in a slot of a catch 84, the deflector plates 79 may be held at any advantageous angle within the hopper and accordingly deflect some of the incoming ballast as desired.

The hopper has both side and end gates (see Figures 8 and 15). The side gates 85 are moved horizontally in and out on runways by handles 86 and are individually operated so that the ballast may be directed out one or more chosen gates. The end gates generally shown at 87 include a trough 88 having an upwardly moving gate 89 and a deflector 90 with a lip 91 to direct the ballast toward the ends of the ties and form a shaped ballast line. The sides of the trough 88 form channels 92 in which the edges of the walls of the deflector 90 are shaped to ride. A chain 93 raises and lowers the deflector 90 and may be fastened at a selected length to a catch 94 as in the case of the chains 83. The bottom of the hopper 73 also has wobble plates 95 and recesses 96 to accommodate the rails 12. Each wobble plate includes a strip 97 and a plate 98 which are separated by one or more bolts 99 and a spring 100 concentric with the bolts as shown in Figure 15. The bolts pass through the plates 98 and fasten the assembly to the hopper, while each spring 100 bears against the plate 98 and the strip 97 so that the plate is resiliently held in a vertical position. Another row of wobble plates similar in construction may be stationed along the other side of the hopper. The bottom of the hopper is also provided with sled runners 101.

The present distributor also includes means to lift it from a track as when removing the machine to a different track or to allow an approaching train to pass. Both at the front and rear of the machine there is a pair of hydraulic cylinders 102 each pivotally secured to the machine. Each pair has a similar construction. For example, the cylinders at the rear extend between guides 103 and are pivotally secured to brackets 104 at one end and to a crossbar 105 at the other. Spring-loaded rods 106 normally withdraw the crossbar to a non-interfering position above the track. When the pistons of the cylinders 102 are extended, the machine is lifted from the tracks as shown in Figure 9. This enables setoff rails 107 to be inserted beneath rollers 108 attached to both sides of the base 10. The pistons of the hydraulic cylinders 102 are then retracted, and the machine is easily rolled from the main track.

The operation section

Referring now to Figure 1 and Figures 10 through 13, an operator's stand 110 is located forwardly of the machine from where its operation is controlled. The stand may include conventional equipment such as a brake 111 and means for starting and running a fuel-fired engine such as a diesel engine 112. The output shaft 113 of this engine has a multi-grooved sheave 114 from which hydraulic pumps 115, 116, and 117 are driven by belts 118, 119, and 120 and pulleys 121, 122, and 123, respectively. A table 124 having a belt guard 125 supports the pumps radially about the sheave 114, and hydraulic hoses 126 connect the pumps to a hydraulic system hereinafter described.

Figure 12:
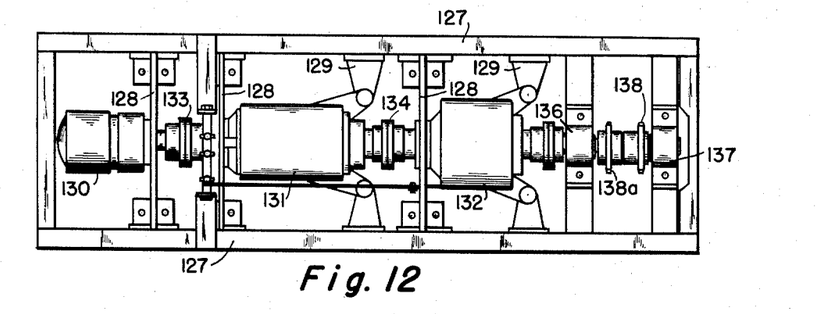
Figures 12 and 13 are plan and side elevations, respectively, of apparatus for propelling the distributor.
Figure 13:
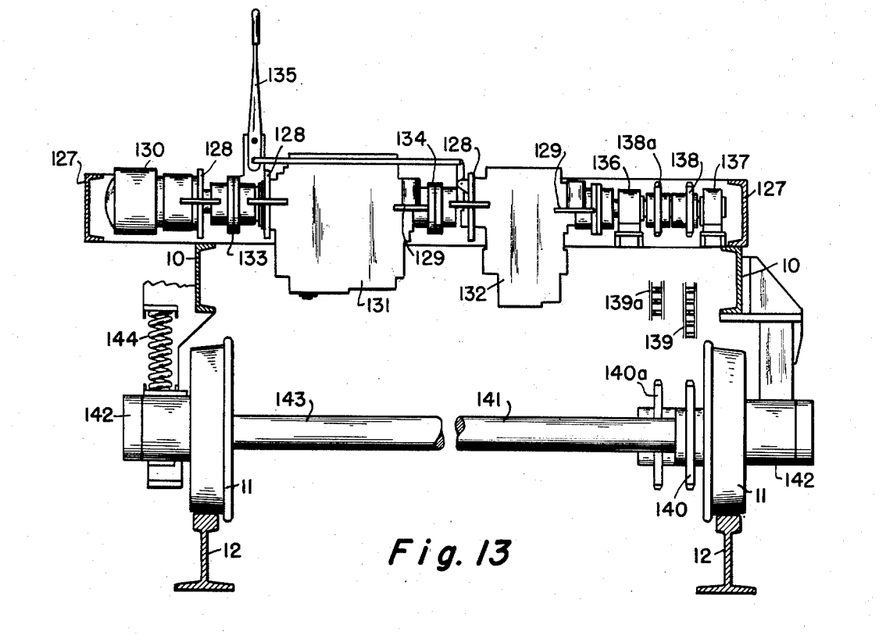

From the stand 110 an operator may also propel the machine. As shown in Figures 12 and 13, a frame 127 disposed transversely of the machine carries by cross plates 128 and supports 129 apparatus to drive the machine. A hydraulic motor 130 drives a three-speed transmission 131 and a two-speed transmission 132 through couplings 133 and 134. Hand levers such as a lever 135 reach to the stand 110 and control the operation of the transmissions 131 and 132. The output shaft of transmission 132 is journaled between bearings 136 and 137 and has a sprocket 138 which engages a drive chain 139. This chain drives a sprocket 140 on the front axle 141 which has a wheel 11 journaled in a box 142. The rear axle 143 may be driven in a like manner by sprocket 138a, chain 139a, and sprocket 140a. The rear axle also has a wheel similarly journaled and may be spring loaded to the base 10 as at 144.

Figure 14:
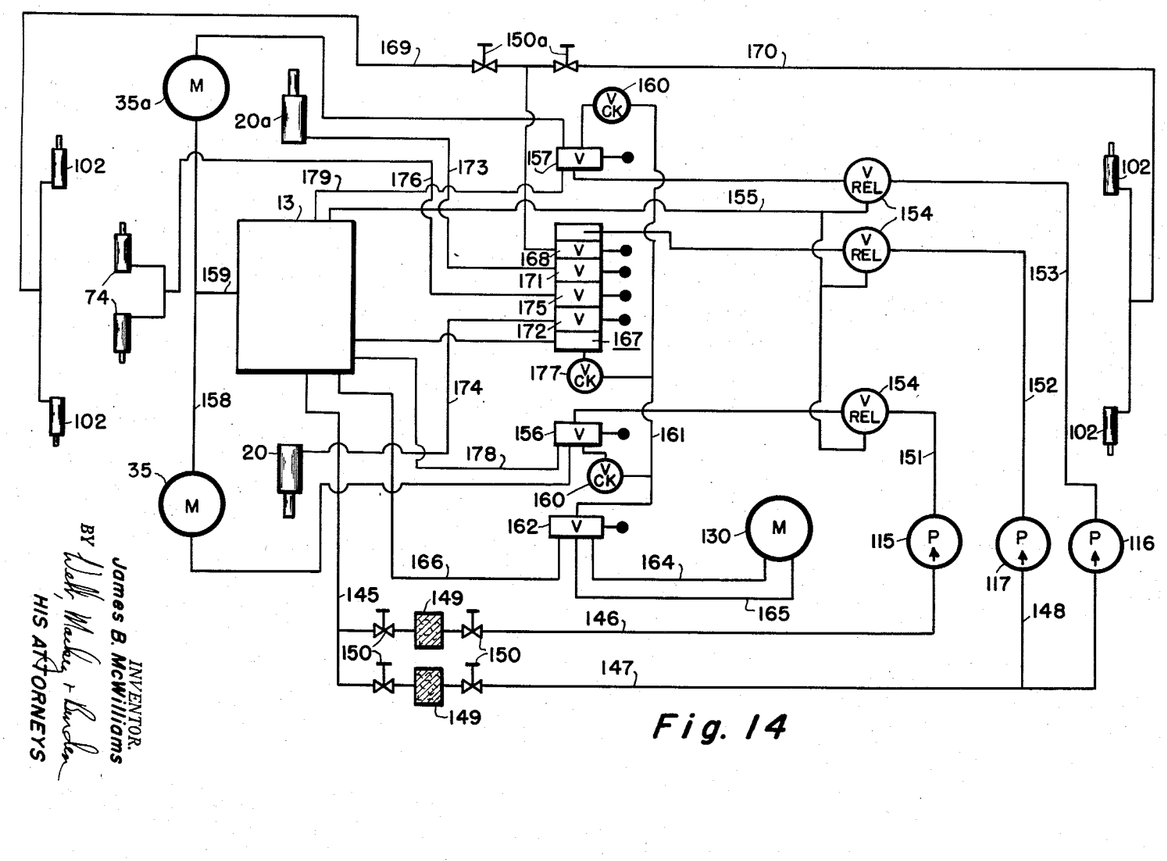
Figure 14 is a schematic flow diagram of a hydraulic system used with the ballast distributor; and, Figure 15 is a perspective of a portion of the hopper.

The hydraulic motor 130 as well as all the previously designated hydraulic apparatus is operated by the system illustrated in Figure 14. When driven by the engine 112 as described, the pumps 115, 116, and 117 draw hydraulic fluid from the tank 13 through lines 145, 146, 147, and 148 as shown in which suitable filters 149 and valves 150 may be placed. The three pumps discharge into lines 151, 152, and 153 which have interconnected relief valves 154 with a common return line 155 to the tank 13. Lines 151 and 153 lead to control valves 156 and 157, respectively, which drive the hydraulic motors 35 and 35a to operate the bucket conveyors. Lines 158 and 159 carry the hydraulic fluid from these motors back to the tank 13. Valves 156 and 157 also open through check valves 160 into a line 161 leading to a valve 162. The latter operates the hydraulic motor 130, which propels the machine, through the lines 164 and 165 and has a return line 166 to the tank.

Line 152 from pump 117 feeds into a bank 167 of control valves. Valve 168 discharges through lines 169 and 170 and valves 150a to the cylinders 102 which lift the machine from the track; valves 171 and 172 open to lines 173 and 174, respectively, to operate the cylinders 20 and 20a which expand and contract the pantographs; and valve 175 leads by line 176 to the cylinders 74 which vertically reciprocate the hopper 73. The valve bank 167 can also discharge into the line 161 through the check valve 177. When none of the described apparatus is being used, the control valves 156, 157, and 162 are in a neutral or open position which allows the discharge of the pumps to empty back into the tank 13. For example, pump 115 discharges through valve 156 and line 178 to the tank; pump 116, through valve 157 and line 179; and pump 117 through the bank of valves 167, check valve 177, line 161, and then through valve 162 and line 166.

Operation of the machine

In operation, the machine is hydraulically driven to a point of use with the conveyors retracted. The conveyors are then quickly extended and simultaneously lowered by the pantographs to reach the ballast. The hydraulic system now drives the conveyors which transfer the ballast and dirt mixed therewith from along the ties to the chutes 34. During this time, the scoop 55 may be in the position of Figure 5. As the ballast falls through the chutes, most of the dirt will be separated by passing through the reticulate surfaces 70. The ballast, however, continues into the hopper which may be used to control the direction as well as the rate of ballast flow. For example, the deflector plates 79 may be set at a desired angle to deflect the ballast within the hopper. The deflector plates 79 are especially useful on banked tracks or when it is desired to throw the ballast to an end gate. Further, the hopper may be placed at any vertical position by the cylinders 74 to spread out the exiting ballast as the machine continues to move and to control the rate of ballast flow from the hopper. Still further, one or more of the side gates 85 may be opened or closed additionally to control the ballast flow, and the end gates 87 may be similarly treated. The wobble plates 95 not only also tend to spread out the layer of discharged ballast but prevent ballast from being wedged between a tie and gate. Because of the spring-loaded construction, the wobble plates are easily tripped from a normal vertical position to permit a fixed object, such as a protruding spike, to pass beneath the machine. In case a relatively long obstruction is met, such as a warped tie, the sled runners 101 slide across it and thereby lift the hopper over the tie. By closing the side and end gates, it is possible to use the hopper to carry a charge of ballast to another point of use such as at a crossing where ballast cannot ordinarily be picked up.

After distributing the ballast, the same portion of track can be traveled with the scoop in another setting, such as in the setting of Figure 7 to dress the ballast bed. When the ballast has been distributed and dressed if desired, the conveyors may be simply retracted by the pantographs without folding or pivoting them. If at any time it is desired to remove the machine from the track, the cylinders 102 elevate the machine as previously mentioned, and the machine moves off the track by rollers 108 on setoff rails 107.

While the foregoing disclosure describes a presently preferred embodiment, it is understood that the invention may be practiced in other forms within the scope of the following claim.

I claim:

A ballast cleaner and distributor including a vehicle mounted on wheels for movement along tracks supported by ties around which it is desired to distribute ballast, a conveyor depending from each side of the vehicle in angular relationship therewith, the lower end of the conveyor having a scoop which engages ballast lying along the track, cleaning means to receive the discharge of the conveyors, a storage hopper on said vehicle to receive the discharge of the cleaning means and to direct the flow of ballast back along the tracks; the improvement comprising a plurality of outlets on said hopper, individually adjustable closures for each of the outlets, a wobble plate stationed adjacent and below each outlet and resiliently mounted on the hopper to engage and spread the ballast discharged through the outlets, said wobble plates being normally vertically disposed but being adapted to pivot about an edge to assume a desired angular position, and means to move the hopper vertically during the ballast flow from said outlets such that the elevation of the hopper in conjunction with the movement of the vehicle aids in controlling the volume of ballast deposited from the outlets.

References Cited in the file of this patent
UNITED STATES PATENTS

| | | |
|---|---|---|
| 978,691 | Cafferty | Dec. 13, 1910 |
| 1,029,895 | Schellenger | June 18, 1912 |
| 1,164,281 | Haywood | Dec. 14, 1915 |
| 1,468,528 | Vena | Sept. 18, 1923 |
| 1,520,059 | Jeffrey | Dec. 23, 1924 |
| 1,660,482 | Erickson | Feb. 28, 1928 |
| 1,732,545 | Straw | Oct. 22, 1929 |
| 1,743,579 | Straw | Jan. 14, 1930 |
| 1,792,148 | Dobbins et al. | Feb. 10, 1931 |
| 2,003,606 | Protzeller | June 4, 1935 |
| 2,107,639 | Madison | Feb. 8, 1938 |
| 2,142,208 | Protzeller | Jan. 3, 1939 |
| 2,284,035 | Blair | May 26, 1942 |
| 2,734,730 | Talboys | Feb. 14, 1956 |
| 2,764,450 | Rosener | Sept. 25, 1956 |
| 2,775,438 | Bach et al. | Dec. 25, 1956 |